US006459822B1

(12) United States Patent
Hathaway et al.

(10) Patent No.: US 6,459,822 B1
(45) Date of Patent: Oct. 1, 2002

(54) VIDEO IMAGE STABILIZATION AND REGISTRATION

(75) Inventors: David H. Hathaway, Huntsville, AL (US); Paul J. Meyer, Huntsville, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/364,919

(22) Filed: Jul. 26, 1999

Related U.S. Application Data

(60) Provisional application No. 60/099,056, filed on Aug. 26, 1998.

(51) Int. Cl.[7] .............................. G06K 9/32; G09G 5/00
(52) U.S. Cl. ..................... 382/296; 382/298; 345/649; 345/672
(58) Field of Search ................................. 382/286, 173, 382/219, 220, 276, 278, 279, 296, 298, 299, 300; 345/436–439, 132, 138, 502, 648, 649, 660, 672; 358/413, 408, 430; 375/240.16

(56) References Cited

U.S. PATENT DOCUMENTS

| | | | |
|---|---|---|---|
| 4,675,532 A | | 6/1987 | Carson ........................ 348/294 |
| 4,937,666 A | * | 6/1990 | Yang .......................... 348/413 |
| 4,979,738 A | * | 12/1990 | Frederiksen ................. 345/132 |
| 5,144,423 A | * | 9/1992 | Knauer et al. ........... 375/240.17 |
| 5,263,135 A | * | 11/1993 | Dei ............................. 345/502 |
| 5,276,513 A | * | 1/1994 | van der Wal et al. ... 375/240.16 |
| 5,278,915 A | | 1/1994 | Chupeau et al. ............ 382/236 |
| 5,321,748 A | * | 6/1994 | Zeidler et al. .............. 380/214 |
| 5,518,497 A | | 5/1996 | Widjaja et al. ............... 600/27 |
| 5,534,925 A | | 7/1996 | Zhong ..................... 348/384.1 |
| 5,566,674 A | * | 10/1996 | Weng .......................... 600/443 |
| 5,627,915 A | * | 5/1997 | Rosser et al. ............... 382/219 |
| 5,629,988 A | | 5/1997 | Burt et al. .................. 382/276 |
| 5,635,994 A | * | 6/1997 | Drexler et al. .............. 348/699 |
| 5,909,657 A | | 6/1997 | Onishi et al. ............... 702/108 |
| 5,657,402 A | | 8/1997 | Bender et al. .............. 382/284 |
| 5,717,793 A | * | 2/1998 | Ushida et al. .............. 382/298 |
| 5,784,175 A | * | 7/1998 | Lee ............................ 358/433 |
| 5,920,657 A | | 7/1999 | Bender et al. .............. 382/284 |
| 5,963,675 A | | 10/1999 | van der Wal et al. ....... 382/260 |
| 6,037,988 A | * | 3/2000 | Gu et al. ................. 375/240.16 |
| 6,173,089 B1 | * | 1/2001 | Van Lerberghe ........... 382/299 |

\* cited by examiner

Primary Examiner—Jose L. Couso
Assistant Examiner—Kanji Patel
(74) Attorney, Agent, or Firm—James J. McGroary (57) ABSTRACT

A method of stabilizing and registering a video image in multiple video fields of a video sequence provides accurate determination of the image change in magnification, rotation and translation between video fields, so that the video fields may be accurately corrected for these changes in the image in the video sequence. In a described embodiment, a key area of a key video field is selected which contains an image which it is desired to stabilize in a video sequence. The key area is subdivided into nested pixel blocks and the translation of each of the pixel blocks from the key video field to a new video field is determined as a precursor to determining change in magnification, rotation and translation of the image from the key video field to the new video field.

23 Claims, 6 Drawing Sheets

VIDEO IMAGE STABILIZATION AND REGISTRATION

CROSS-REFERENCE TO RELATED APPLICATION

This application claims the benefit of the filing date of provisional application serial No. 60/099,056, filed Aug. 26, 1998, the disclosure of which is incorporated herein by this reference.

ORIGIN OF THE INVENTION

This invention was made by employees of the United States Government and may be manufactured and used by or for the Government for Governmental purposes without the payment of royalties.

BACKGROUND OF THE INVENTION

1. Field of the Invention

The present invention relates generally to video image processing methods and, in an embodiment described herein, more particularly provides a method of stabilizing and registering video images.

2. Description of Related Art

Techniques presently exist for stabilizing video images. These techniques typically function to reduce or eliminate image translation (i.e., displacement) horizontally and vertically in a video sequence. In general, these techniques are very limited in effectiveness, since they are not able to compensate for image rotation or dilation. In addition, these techniques are sensitive to the effects of parallax in which objects in the foreground and background are moving at different rates and/or directions. Furthermore, these techniques are typically able to determine image motion only to the nearest pixel.

Video image stabilization and other image enhancing techniques are described in the following prior U.S. Patents: U.S. Pat. No. 5,784,175 to Lee; U.S. Pat. No. 5,453,800 to Kondo, et al.; U.S. Pat. No. 5,327,232 to Kim; U.S. Pat. No. 5,210,605 to Zaccarin, et al.; U.S. Pat. No. 4,924,306 to van der Meer, et al.; U.S. Pat. No. 5,815,670 to Iverson, et al.; U.S. Pat. No. 5,742,710 to Hsu, et al.; U.S. Pat. No. 5,734,737 to Chang, et al.; U.S. Pat. No. 5,686,973 to Lee; U.S. Pat. No. 5,535,288 to Chen, et al.; U.S. Pat. No. 5,528,703 to Lee; U.S. Pat. No. 5,778,100 to Chen, et al.; U.S. Pat. No. 5,748,784 to Sugiyama; U.S. Pat. No. 5,748,761 to Chang, et al.; U.S. Pat. No. 5,745,605 to Bard, et al.; U.S. Pat. No. 5,737,447 to Bourdon, et al.; U.S. Pat. No. 5,734,753 to Bunce; U.S. Pat. No. 5,729,302 to Yamauchi; U.S. Pat. No. 5,703,966 to Astle; U.S. Pat. No. 5,684,898 to Brady, et al.; U.S. Pat. No. 5,581,308 to Lee; U.S. Pat. No. 5,555,033 to Bazzaz; U.S. Pat. No. 5,488,675 to Hanna; U.S. Pat. No. 5,488,674 to Burt, et al.; U.S. Pat. No. 5,473,364 to Burt; U.S. Pat. No. 5,325,449 to Burt, et al.; U.S. Pat. No. 5,259,040 to Hanna; U.S. Pat. No. 5,067,014 to Bergen, et al.; and U.S. Pat. No. 4,797,942 to Burt.

From the foregoing, it can be seen that it would be quite desirable to provide a video image stabilization and registration technique which is more accurate than previous techniques, which is capable of compensating for image rotation and dilation, and which is capable of compensating for the effects of parallax.

SUMMARY OF THE INVENTION

In carrying out the principles of the present invention, in accordance with an embodiment thereof, a method is provided for stabilizing and registering video images. The method utilizes nested pixel blocks in accurately determining image translation, rotation and dilation in a video sequence.

In one aspect of the invention, displacement and dilation of an image from one video field to another in a video sequence are determined by choosing a key video field and selecting a key area of pixels within the key video field which contains the image. The key area is then subdivided into multiple levels of nested pixel blocks. Translation of the key area from the key field to a new video field is approximated by searching for an area in the new video field having a maximum correlation to the key area. The key area translation approximation is used as a starting point for determination of the translation of each of the pixel blocks in the largest pixel block subdivision from the key video field to the new video field. The translation of each of the pixel blocks in the largest pixel block subdivision is then used as a starting point for determination of the translation of each of the respective associated pixel blocks in the next smaller pixel block subdivision. This process is repeated until a determination of the translation of each of the pixel blocks in the smallest pixel block subdivision is made. Certain of the pixel blocks may be masked, for example, if a maximum correlation coefficient between one of the smallest pixel blocks and pixel blocks in the new video field is less than a predetermined value, in which case they are not considered in any subsequent calculations.

In another aspect of the present invention, translation, rotation and change in magnification of the key area from the key video field to the new video field is determined using the translations of each of the pixel blocks in the smallest pixel block subdivision. The change in magnification is determined by dividing each of relative horizontal and vertical displacements between pairs of pixel blocks by the respective horizontal and vertical distances between the pixel block pairs, and calculating a weighted average. The rotation is determined by dividing each of relative horizontal and vertical displacements between pairs of pixel blocks by respective vertical and horizontal distances between the pixel block pairs, and calculating a weighted average. The translation of the key area is determined by correcting the translation of each of the pixel blocks in the smallest pixel block subdivision for the change in magnification and rotation, and then averaging the pixel block translations. In the above process, further pixel blocks may be masked, for example, if a calculation produces a value which is significantly different from the average of multiple similarly calculated values.

In yet another aspect of the present invention, the change in magnification, rotation and translation of the key area from the key video field to the new video field is used to pre-process a subsequent video field for evaluation of the change in magnification, rotation and translation of the key area from the key video field to the subsequent video field. The change in magnification, rotation and translation of the key area from the key video field to a preprocessed subsequent video field is then added to the change in magnification, rotation and translation of the key area from the key video field to the new video field to thereby determine change in magnification, rotation and translation of the key area from the key video field to the subsequent video field.

These and other features, advantages, benefits and objects of the present invention will become apparent to one of ordinary skill in the art upon careful consideration of the detailed description of a representative embodiment of the invention hereinbelow and the accompanying drawings.

DESCRIPTION OF THE PREFERRED EMBODIMENT

Figure 1:
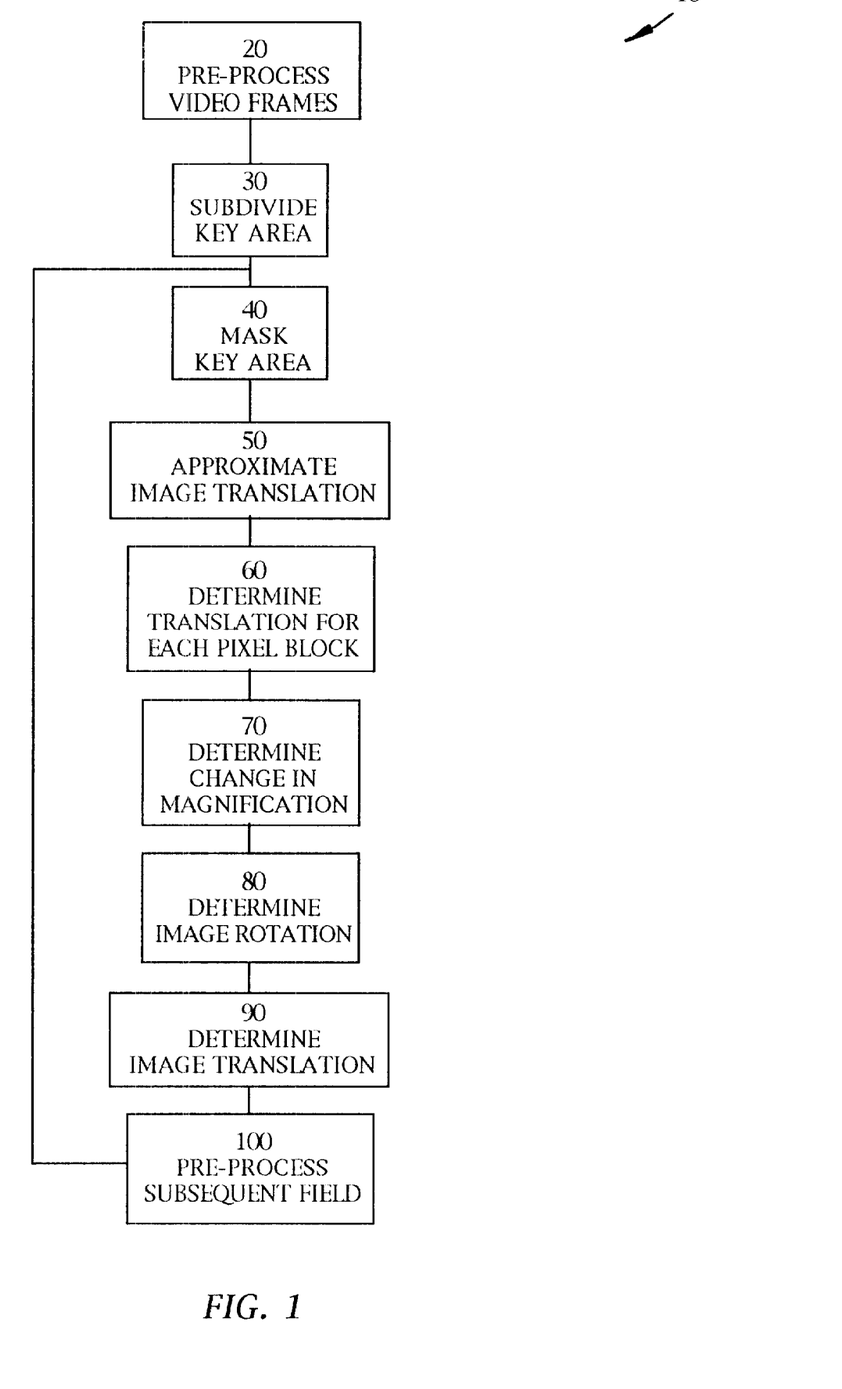
FIG. 1 is a flow chart representing a method embodying principles of the present invention.

Representatively illustrated in FIG. 1 is a method 10 which embodies principles of the present invention. In the following description of the method 10, reference is made to a standard video format well known to those skilled in the art, in which a video sequence includes multiple sequentially displayed video frames, with each video frame comprising two interlaced video fields, each of which presents an image as an arrangement of pixels having red, green and blue brightness levels, etc. However, it is to be clearly understood that the principles of the present invention are not limited to use with the standard video format, and that other formats, and other types of formats may be utilized, without departing from the principles of the present invention.

The method 10 includes steps 20, 30, 40, 50, 60, 70, 80, 90 and 100, and each of these steps includes substeps representatively depicted in the accompanying FIGS. 2, 3, 4, 5, 6, 7, 8, 9 and 10, respectively. Note that steps 50–100 are repeated, with these steps being performed for each video field in a video sequence, as described in further detail below.

Figure 2:
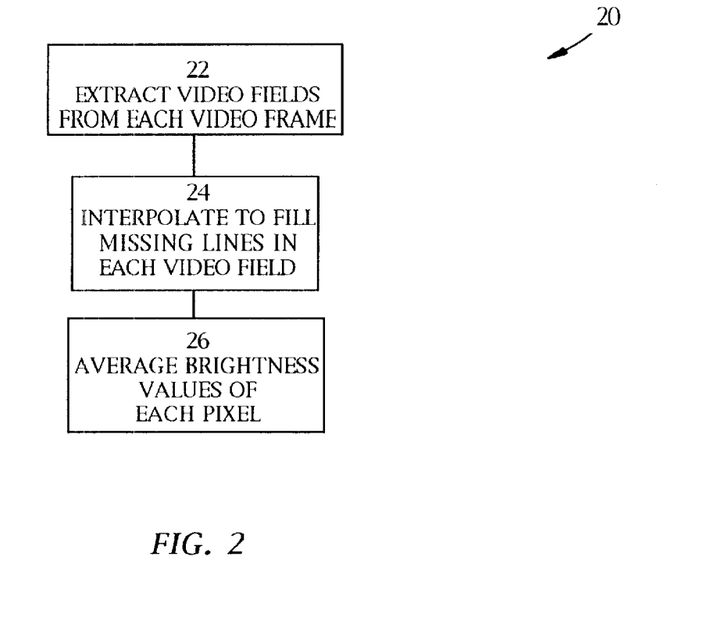
FIG. 2 is a flow chart representing substeps in a video frame pre-processing step of the method of FIG. 1.

Step 20 is a video frame pre-processing step. Due to the fact that the standard video format video frame includes two interlaced video fields, one video field following the other in time, it is preferred to separate these video fields before beginning to analyze the motion of an image of interest therein.

In step 22, the video fields are extracted from each video frame of a video sequence. In the standard video format, one video field consists of even-numbered horizontal lines, and the other video field consists of odd-numbered horizontal lines, of each video frame, with the video fields being separated by 1/60th of a second in time. These horizontal lines are rows of pixels making up the image shown in the video frame.

When the video fields are separated out, each will have alternating blank lines therein, due to the absence of the corresponding other video field from its video frame. Therefore, in step 24, interpolation is used to fill in the missing lines in each video field. Video interpolation techniques are well known to those skilled in the art and will not be described further herein. Any such interpolation techniques may be utilized in keeping with the principles of the present invention.

In step 26, each video field image is transformed into a gray-scale image by averaging together the red, green and blue brightness values of each pixel of the video field. Of course, step 20 could begin with a gray-scale (i.e., black and white in common parlance) video sequence, in which case step 26 would be unnecessary.

Figure 3:
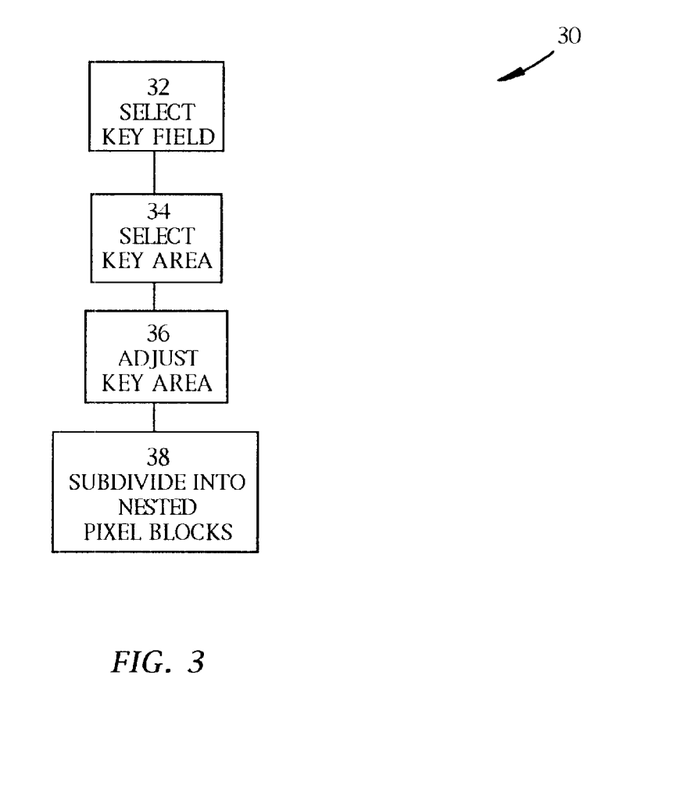
FIG. 3 is a flow chart representing substeps in a key area subdividing step of the method of FIG. 1.

Step 30 is a key area subdividing step. This step produces groupings of pixels on multiple levels, such that each pixel group or block (other than the smallest size of pixel block) includes multiple smaller pixel blocks. In this sense, the pixel blocks are "nested" with respect to each other.

In step 32, a key field is selected. The key field is one of the video fields extracted in step 22. Preferably, the key field contains an image of interest, and at least a portion of that image displays an object, person, etc. which the objective is to stabilize in the video sequence. For example, if the video sequence shows an image of a moving car and it is desired to stabilize the video sequence so that the image of the car is relatively motionless, the key field will preferably be selected as one of the video fields which contains a relatively clear centralized image of the car. The key field may be any one of the video fields in the video sequence, e.g., at the beginning, middle or end of the video sequence.

In step 34, a key area within the key field is selected. Preferably, the key area is a rectangular array of pixels and contains the specific image of interest about which it is desired to stabilize the video sequence, with a minimum of background, foreground, extraneous images, etc. Using the above example, the key area would preferably contain the image of the car and little else. The key area may be any group of pixels in the key field. For use as an example in the following further description of the method 10, the key area may be a rectangular group of pixels which is 358 pixels wide by 242 pixels high.

In step 36, the key area is preferably adjusted so that it contains a convenient whole number multiple of the smallest pixel block size into which the key area is to be subdivided. Thus, the key area is adjusted so that it can be conveniently subdivided into progressively smaller blocks of pixels. Using the above example, and assuming that the smallest desired pixel block size is a 15×15 block of pixels, the next larger pixel block size is a 30×30 block of pixels and the largest pixel block size is a 60×60 block of pixels, the key area may be adjusted to a size of 360×240 pixels. It will be readily appreciated that an array of 360×240 pixels may be conveniently subdivided into 60×60 pixel blocks, further subdivided into 30×30 pixel blocks, and still further subdivided into 15×15 pixel blocks.

In step 38, the adjusted key area is subdivided into nested pixel blocks, that is, larger pixel blocks having smaller pixel blocks therein. Using the above example, there will be 24 of the 60×60 pixel blocks in the 360×240 adjusted key area, there will be 96 of the 30×30 pixel blocks (four 30×30 pixel blocks in each 60×60 pixel block) and there will be 384 of the 15×15 pixel blocks (four 15×15 pixel blocks in each 30×30 pixel block).

In this example, the pixel block subdivisions have been selected to be 15×15 as the smallest, 30×30 as the next larger, and 60×60 as the largest, the pixel blocks therein are square, there are three levels of pixel blocks, and each pixel block subdivision has four times the number of pixel blocks as the next larger pixel block subdivision. However, it is to be clearly understood that other pixel block sizes, other pixel block shapes, other numbers of pixel block levels and other relationships between pixel block subdivisions may be used, without departing from the principles of the present invention. For instance, the smallest pixel block size could be 12×12, pixel blocks could be rectangular, but not square, there could be four levels of nested pixel blocks and one level could have nine times the number of pixel blocks as the next larger pixel block subdivision, while another level could have twelve times the number of pixel blocks as the next larger pixel block subdivision.

Figure 4:
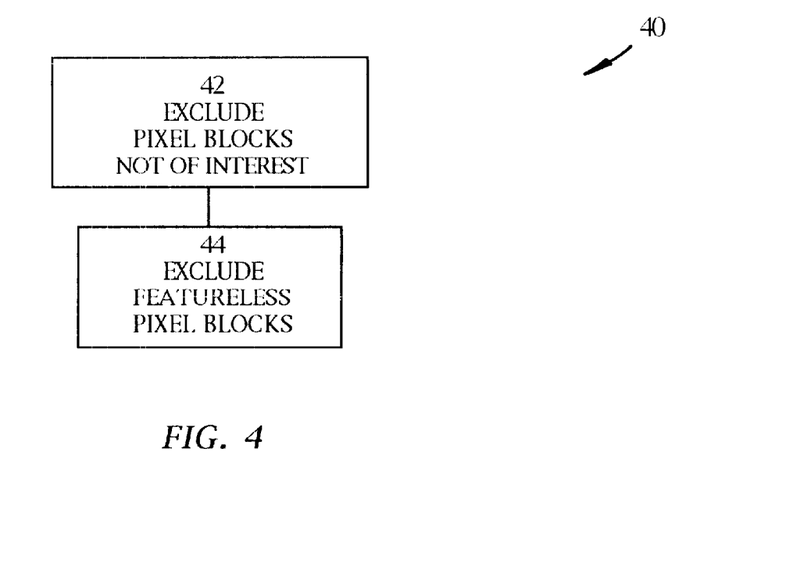
FIG. 4 is a flow chart representing substeps in a key area masking step of the method of FIG. 1.

Step 40 is a data masking step in which selected pixel blocks are excluded from further consideration in the method 10. A data mask is constructed by producing an array of numbers in which each element of the array corresponds to one of the smallest pixel blocks of the key area. Using the above example of a 360×240 pixel key area and 15×15 smallest pixel blocks, the data mask would be a 24×16 array. An element of the array is set to 1 if the corresponding pixel block is to be included in further calculations, and the element is set to 0 if the corresponding pixel block is to be excluded from further calculations.

In step 42, an operator is permitted to manually exclude pixel blocks which are not of interest. Using the above example of a key area containing an image of a car, the key area may also include images of other objects, such as objects in the foreground, background, etc., which are not germane to the analysis. Computational economy and accuracy are enhanced when the pixel blocks containing these extraneous images are masked by changing the corresponding elements in the data mask array to 0.

In step 44, featureless pixel blocks are masked. This masking is done automatically and results when the scale of the variations in a pixel block are smaller than a predetermined value. The scale of the variations in a pixel block is given by the standard deviation of the average brightness level of each individual pixel in the pixel block. Recall that the average brightness level of each pixel was determined in step 26 above.

Figure 5:
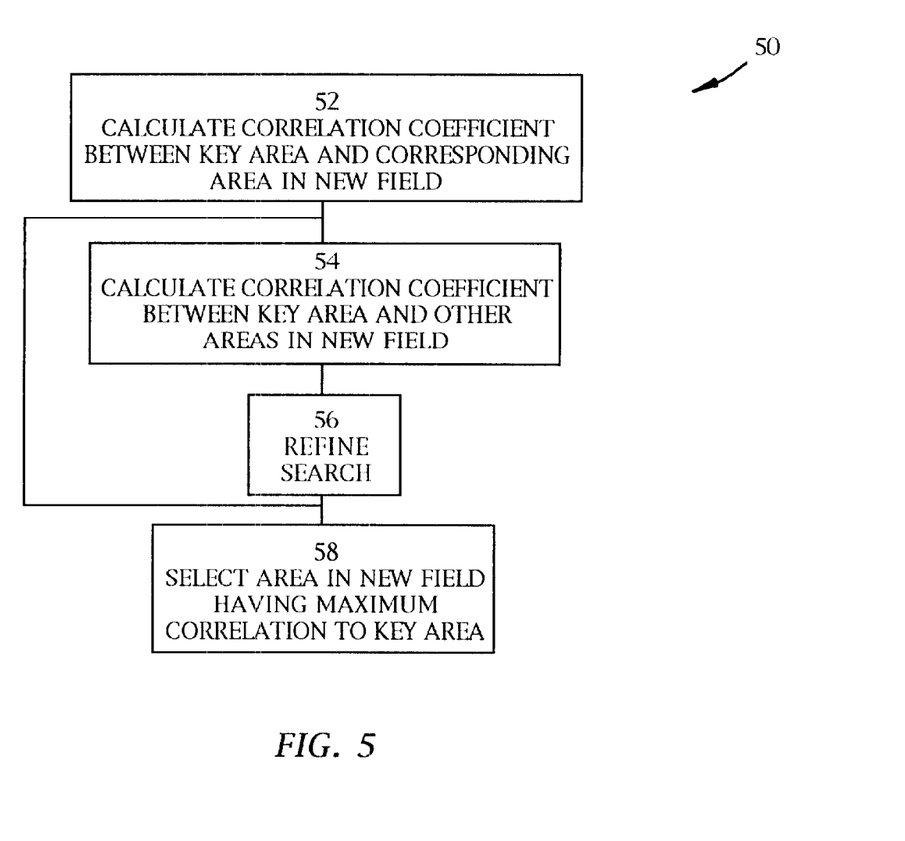
FIG. 5 is a flow chart representing substeps in an image translation approximating step of the method of FIG. 1.

Step 50 provides an approximation of the translation (horizontal and vertical shift or displacement) of the key area from the key field to a new field in the video sequence. This approximation is used to aid in the search for translation of the progressively smaller pixel blocks, as described below.

In step 52, a correlation coefficient between the key area and a corresponding area in the new video field is calculated by a process known as cross-correlation. Such calculation of correlation coefficient between arrays of pixels is well known to those skilled in the art and results in a number which is related to the degree to which one array "matches" another array. Thus, the key area is cross-correlated with a corresponding area in the new video field, the corresponding area having the same shape and size as the key area and being located in the new field as the key area is located in the key field.

In step 54, the key area is cross-correlated with other areas in the new video field, with the centers of the other areas being displaced relative to the center of the corresponding area used in step 52. For example, correlation kid coefficients may be calculated for areas 10 pixels to the right, 10 pixels to the left, 10 pixels up and 10 pixels down relative to the corresponding area used in step 52. If a correlation coefficient between the key area and one of these other areas is greater than the correlation coefficient between the key area and the corresponding area found in step 52, then there is an indication that the image has translated in the direction of the area having the increased correlation coefficient. If the correlation coefficient between the key area and the corresponding area found in step 52 is greater than the correlation coefficient of each of the other areas, but one of the other areas has a correlation coefficient greater than the remainder of the other areas, then there is an indication that the image has translated in the direction of the other area having the maximum correlation coefficient, but is between the corresponding area and the other area having the maximum correlation coefficient.

In step 56, the search is refined based on the indications given by steps 52 and 54. Thus, the correlation coefficients calculated in steps 52 and 54 are used as a basis on which the search is refined. In general, the objective is to determine the area in the new field having the maximum correlation coefficient.

As depicted in FIG. 5, steps 54 and 56 are repeated, with correlation coefficients being calculated, the search refined, correlation coefficients calculated again, the search refined again, etc., until no further increase in correlation coefficient is achieved.

In step 58, the area in the new field having the maximum correlation to the key area is selected. This area is considered to be a rough approximation of the actual location of the image contained in the key area, as translated between the key field and the new field.

Figure 6:
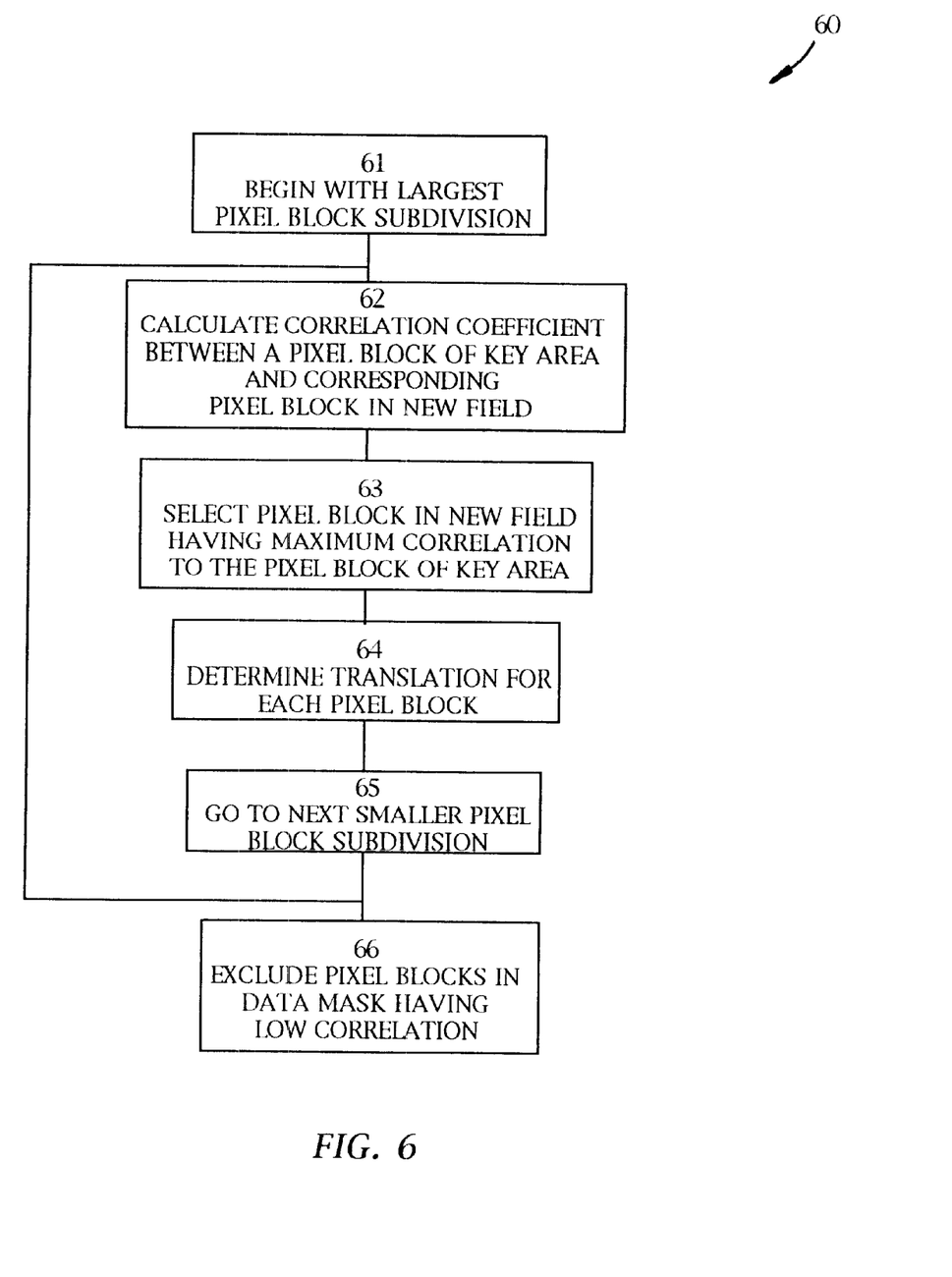
FIG. 6 is a flow chart representing substeps in a pixel block translation determining step of the method of FIG. 1.

Step 60 is in large part a repeat of step 50, except that it is performed for each pixel block in each pixel block subdivision, beginning with the largest pixel block subdivision. As step 50 began with a calculation of correlation coefficient between the key area and the corresponding area in the new video field, step 60 begins with a calculation of correlation coefficient between one of the largest pixel blocks and a corresponding pixel block in the area selected in step 58. Using the above example, a 60×60 pixel block of the key area is first cross-correlated with a corresponding 60×60 pixel block in the area selected in step 58. The 60×60 pixel block of the key area is then cross-correlated with other 60×60 pixel blocks having respective centers which are displaced relative to the center of the corresponding 60×60 pixel block. The results of these calculations are then used to indicate the direction of translation of the 60×60 key area pixel block. The search is then refined and the process repeated to determine the translation of the 60×60 pixel block from the key area to the area selected in step 58 by finding the 60×60 pixel block having maximum correlation to the 60×60 key area pixel block. This process is then repeated for each of the other 60×60 pixel blocks in the key area, so that the translation of each 60×60 pixel block from the key field to the new field is determined.

Using the translation of its associated 60×60 pixel block as a first approximation, the translation of each 30×30 pixel block is determined. Then, using the translation of its associated 30×30 pixel block as a first approximation, the translation of each 15×15 pixel block is determined. Thus, step 60 of the method 10 progresses from the largest pixel block subdivision to the smallest pixel block subdivision, determining the translation of each pixel block within each subdivision, using the previously determined translation of the next larger associated pixel block as a starting point for determining the translation of each pixel block. Specific details of substeps 61–66 of step 60 are described in further detail below.

In step 61, the determination of each key field pixel block's translation begins with the largest pixel block subdivision. Using the example given above, wherein the 360× 240 pixel key area is first subdivided into 60×60 pixel blocks, further subdivided into 30×30 pixel blocks, and then further subdivided into 15×15 pixel blocks, the process of step 60 begins with the 60×60 pixel blocks. Of course, if other pixel block subdivisions are made, then the process of step 60 might begin with pixel blocks of another size. For instance, the key area could be initially subdivided into 40×40 pixel blocks, in which case step 61 would begin with 40×40 pixel blocks, instead of 60×60 pixel blocks.

In step 62, the correlation coefficient between a pixel block and the corresponding pixel block in the new field is calculated. For the largest pixel block subdivision, the corresponding pixel block in the new field is the pixel block of the key field translated the same as the key area translated from the key field to the new field. In this manner, the translation of the key area from the key field to the new field, as determined in step 50, is used as a first approximation of the translation of each of the largest pixel block subdivision pixel blocks. Using the above example, the correlation coefficient would be calculated for a 60×60 pixel block of the key area and a 60×60 pixel block of the new field translated the same relative to the 60×60 pixel block of the key area as the key area translated from the key field to the new field.

In step 63, a search is performed for the pixel block in the new field having maximum correlation to the pixel block in the key area. This step is similar to steps 54, 56 and 58 described above, in which an area in the new field having maximum correlation to the key area is selected. In other words, step 63 is steps 54, 56 and 58 performed for an individual pixel block, rather than for the entire key area. Thus, correlation coefficients between the individual pixel block of the key area and pixel blocks displaced relative to the corresponding pixel block of the new field are calculated, the search is refined based on the results of these calculations, further correlation coefficients are calculated, etc., until the pixel block of the new field having the maximum correlation to the pixel block of the key area is determined.

In step 64, the translation of each pixel block is determined. Steps 62 and 63 have been described above as having been performed for a single pixel block of a pixel block subdivision. However, step 64 signifies that the translation of each pixel block in the pixel block subdivision is determined. This determination is made by performing steps 62 and 63 for each pixel block in the pixel block subdivision. Using the example given above, the key area contains 24 of the 60×60 pixel blocks. Thus, steps 62 and 63 would be performed 24 times for the largest pixel block subdivision, thereby permitting the translation of each of the 60×60 pixel blocks to be determined independently.

Note that it cannot be assumed that the pixel blocks are translated from the key field to the new field the same as the key area is translated from the key field to the new field, since rotation and change of magnification of the image from the key field to the new field may change the relative positionings of the pixel blocks. This is the reason the approximate translation of the key area from the key field to the new field as found in step 50 is used only as a starting point for determination of the translation of each pixel block of the largest pixel block subdivision.

In step 65, the process is advanced to the next smaller pixel block subdivision. Thus, after the translation of each pixel block in the largest pixel block subdivision is determined, the next smaller pixel block subdivision is evaluated to determine the translation of each pixel block therein. FIG. 6 shows that steps 62–65 are repeated, so that the translation of each pixel block in each pixel block subdivision is determined, progressing from the largest pixel block subdivision to the smallest pixel block subdivision.

Note that in step 62, when a correlation coefficient for a pixel block in a pixel block subdivision other than the largest pixel block subdivision is calculated, the corresponding pixel block in the new field is the pixel block of the key field translated the same as the associated pixel block of the next larger pixel block subdivision translated from the key field to the new field. In this manner, the translation of the associated next larger pixel block from the key field to the new field, as previously determined in step 64, is used as a first approximation of the translation of each of the pixel block subdivision pixel blocks. Using the above example, the correlation coefficient would be calculated for a 30×30 pixel block of the key area and a 30×30 pixel block of the new field translated the same relative to the 30×30 pixel block of the key area as its associated 60×60 pixel block translated from the key field to the new field.

After steps 62–65 have been performed for each pixel block subdivision (except that step 65 cannot be performed after the smallest pixel block subdivision has been evaluated), the result is that the translation of each pixel block in each pixel block subdivision has been determined. This result is very beneficial, since the translations of the smallest pixel blocks may now be used to more precisely determine the translation of the key area from the key field to the new field, and may further be used to determine rotation and dilation of the image between the key field and the new field.

However, it is recognized that the correlation between a pixel block of the key field and a pixel block of the new field may only be very low, due to a variety of reasons. For example, a particular pixel block of the new field which is a translated pixel block of the key area may be obscured due to the presence of an object in the image foreground. Thus, in step 66, a pixel block in the smallest pixel block subdivision is masked when its maximum correlation to pixel blocks in the new field, as determined in step 63, is below a predetermined value. For example, if the maximum calculated correlation coefficient for a pixel block in the smallest pixel block subdivision is less than 0.7, the pixel block may be excluded in the data mask described in step 40 above. If a pixel block is masked, it is not considered in any further calculations in the method 10.

Figure 7:
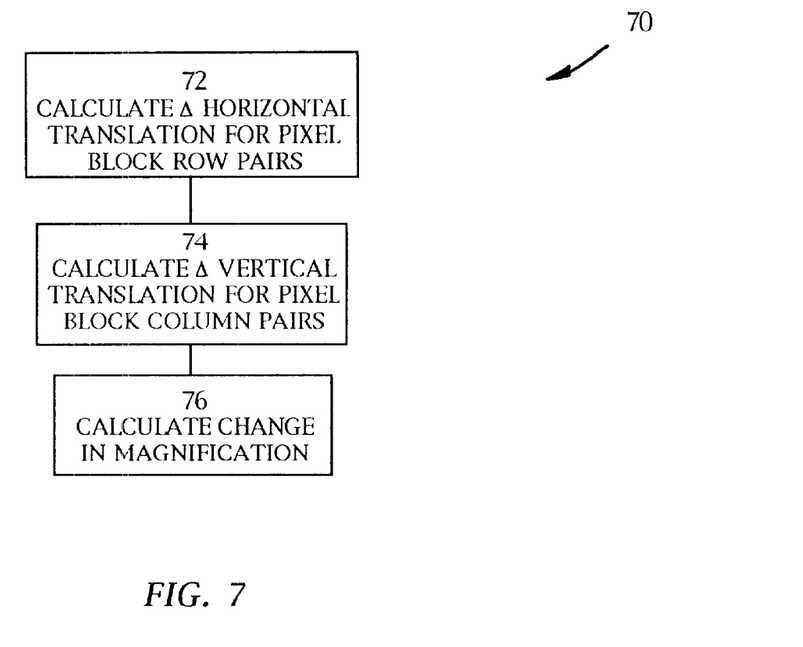
FIG. 7 is a flow chart representing substeps in a magnification change determining step of the method of FIG. 1.

Step 70 is a magnification determination step in which the change in magnification of the image from the key field to the new field is determined. Since step 60 provides a measure of the translation of each pixel block in the smallest pixel block subdivision from the key field to the new field, this information may be used to determine whether the pixel blocks have spread apart or contracted relative to each other, thereby permitting a calculation of the magnification change from the key field to the new field.

In step 72, the difference in horizontal translation is calculated for each pixel block row pair in the smallest pixel block subdivision. Using the example given above, for the 360×240 pixel key area and 15×15 pixel blocks in the smallest pixel block subdivision, there are twenty-four 15×15 pixel blocks in each row of the key area. The change in horizontal translation for each pair of pixel blocks, divided by the distance between the pixel block centers, is calculated for each row of the key area. This calculation gives the horizontal change in magnification for each pixel block pair.

For example, if a pixel block on a row moves to the left 10 pixels from the key field to the new field, while a pixel block 300 pixels away moves to the left 13 pixels from the key field to the new field, the horizontal change in magnification is 1% (a 3 pixel difference in horizontal translation over a 300 pixel distance). As described above, masked pixel blocks are excluded from these calculations.

In step 74, the difference in vertical translation is calculated for each pixel block column pair in the smallest pixel block subdivision. Using the example given above, for the 360×240 pixel key area and 15×15 pixel blocks in the smallest pixel block subdivision, there are sixteen 15×15 pixel blocks in each column of the key area. The difference in vertical translation for each pair of pixel blocks, divided by the distance between the pixel block centers, is calculated for each column of the key area. This calculation gives the vertical change in magnification for each pixel block pair, similar to the manner in which the horizontal change in magnification for pixel block pairs in the key area rows are calculated in step 72.

In step 76, the overall change in magnification of the image from the key field to the new field is calculated. A weighted average of the individual horizontal and vertical magnification changes determined in steps 72 and 74 is calculated, with the magnification changes for more widely spaced apart pixel block pairs being weighted more than those for relatively closely spaced pixel block pairs, since widely spaced apart pixel blocks are more sensitive to changes in magnification. Additionally, individual pixel block pair magnification changes may be excluded from the weighted average if their values are significantly different from the average, for example, a pixel block pair magnification change value may be excluded from the weighted average calculation if it is more than one standard deviation from the average of the magnification changes. In this manner, erroneous magnification change calculations do not affect the weighted average.

Figure 8:
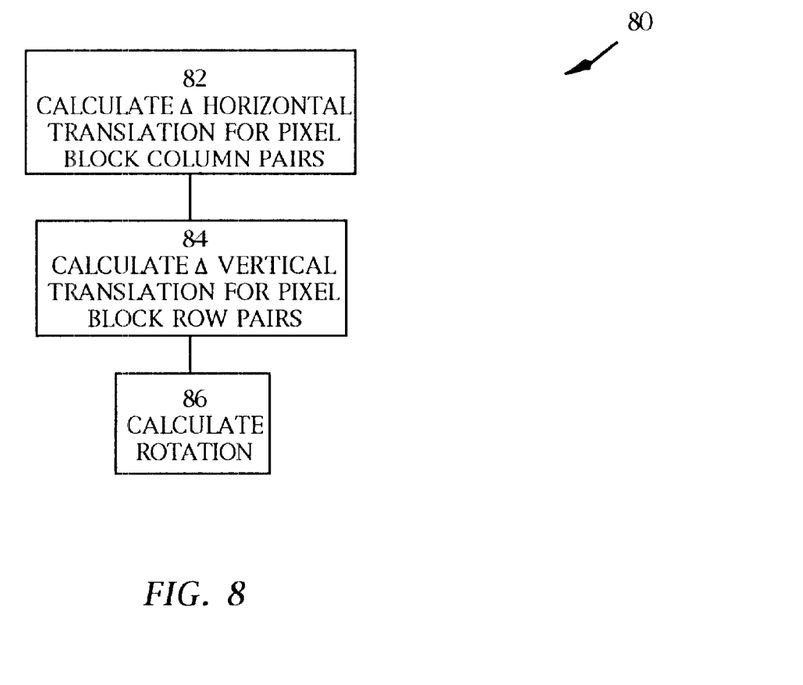
FIG. 8 is a flow chart representing substeps in an image rotation determining step of the method of FIG. 1.

Step 80 is an image rotation determination step. This step is somewhat similar to step 70 in that changes in translation of pixel block pairs from the key field to the new field are used to calculate rotation.

In step 82, the difference in horizontal translation is calculated for each pixel block pair in each of the smallest pixel block subdivision columns. The difference in horizontal translation for each pair of pixel blocks, divided by the distance between the pixel block centers, is calculated for each column of the key area. This calculation gives the rotation for each pixel block pair in each column. For example, if a pixel block in a column moved to the right 1 pixel while another pixel block 300 pixels away in the column moved to the left 2 pixels from the key field to the new field, the difference in horizontal translation would be 3 pixels and the rotation of the pixel block pair would be 0.57° (a 3 pixel difference in displacement over a 300 pixel distance gives an angle with a tangent of 3/300, or an angle of 0.57°).

In step 84, the difference in vertical translation is calculated for each pixel block pair in each of the smallest pixel block subdivision rows. The difference in vertical translation for each pair of pixel blocks, divided by the distance between the pixel block centers, is calculated for each row of the key area. This calculation gives the rotation for each pixel block pair in each row.

In step 86, the overall rotation of the image from the key field to the new field is calculated. A weighted average of the individual pixel block pair rotations determined in steps 82 and 84 is calculated, with the rotations for more widely spaced apart pixel block pairs being weighted more than those for relatively closely spaced pixel block pairs, since widely spaced apart pixel blocks are more sensitive to rotation. Additionally, individual pixel block pair rotation calculations may be excluded from the weighted average if their values are significantly different from the average, for example, a pixel block pair rotation calculation may be excluded from the weighted average calculation if it is more than one standard deviation from the average of the rotation calculations. In this manner, erroneous rotation calculations do not affect the weighted average.

Figure 9:
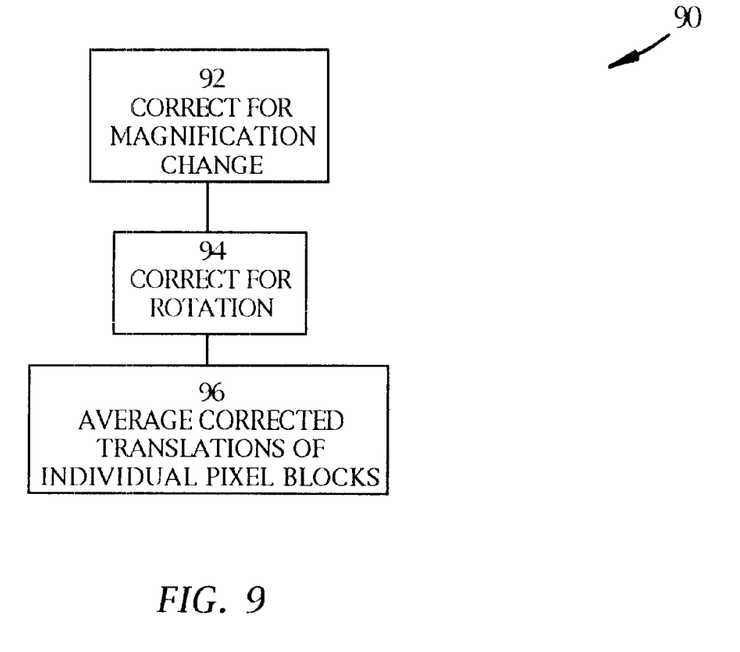
FIG. 9 is a flow chart representing substeps in an image translation determining step of the method of FIG. 1.

Step 90 is an image translation determination step. Recall that an approximation of the image translation from the key field to the new field was determined in step 50. However, since steps 60, 70 and 80 above have provided determinations of the individual translations of the smallest pixel block subdivision pixel blocks, the change in magnification of the image and the rotation of the key area from the key field to the new field, a precise determination of the key area translation may now be made.

In step 92, the translation determined in step 60 for each of the smallest pixel block subdivision pixel blocks is corrected for the change in magnification determined in step 70. This correction is performed by subtracting the horizontal and vertical translations of each of the pixel blocks which are due to the change in magnification from the key field to the new field from the overall horizontal and vertical translations of the respective pixel blocks as determined in step 60.

In step 94, the translation determined in step 60 for each of the smallest pixel block subdivision pixel blocks is further corrected for the rotation determined in step 80. This correction is performed by subtracting the horizontal and vertical translations of each of the pixel blocks which are due to the key area rotation from the key field to the new field from the overall horizontal and vertical translations of the respective pixel blocks as determined in step 60 and corrected for change in magnification in step 92.

In step 96, the overall horizontal and vertical translation for the center of the key area is calculated by averaging the individual horizontal and vertical translations of the smallest pixel block subdivision pixel blocks as corrected in steps 92 and 94. Here again, the data mask is used to exclude translation values from masked pixel blocks. Additionally, individual translation values may be excluded if their values are significantly different from the average.

Figure 10:
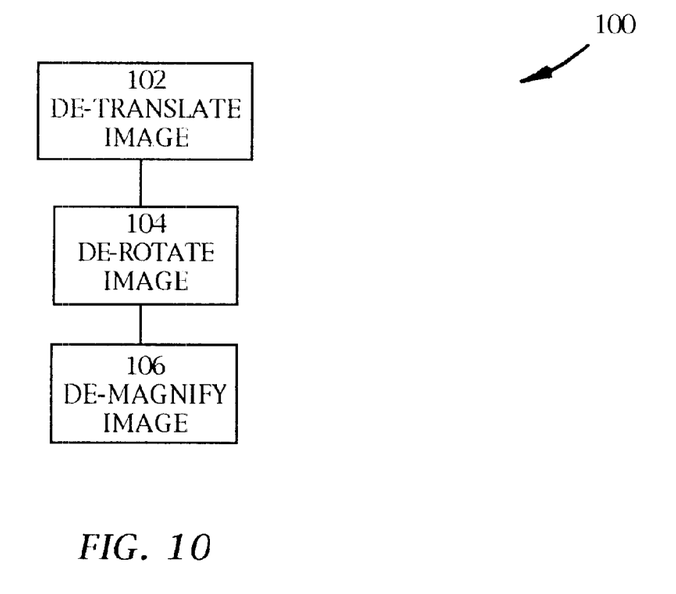
FIG. 10 is a flow chart representing substeps in a subsequent video field pre-processing step of the method of FIG. 1.

Step 100 is a pre-processing step in which the results of steps 70, 80 and 90 are used to pre-process a subsequent field in the video sequence. In this manner, the subsequent field is placed in a condition in which it should more closely match the key field. The determinations of translation, rotation and magnification change of the key area from the key field to the new field are used to perform an initial de-translation, de-rotation and de-magnification of the subsequent field. It is to be clearly understood that use of the term "subsequent" herein to describe a video field does not necessarily signify that the video field is positioned later in the video sequence, but is used to signify that the video field is processed subsequently in the method 10. For example, a "subsequent" video field may actually be positioned earlier in time in a video sequence, since a video sequence may be processed from back to front (later to earlier in time), from the middle to either end, etc.

In step 102, the image contained in the subsequent field is de-translated, that is, it is translated horizontally and vertically opposite to the respective distances and directions the key area translated from the key field to the new field as determined in step 90.

In step 104, the image contained in the subsequent field is de-rotated, that is, it is rotated opposite to the angle and direction the key area rotated from the key field to the new field as determined in step 80.

In step 106, the image contained in the subsequent video field is demagnified, that is, it is magnified (or reduced in magnification) opposite to the change in magnification of the key area from the key field to the new field as determined in step 70.

Note that FIG. 1 indicates that steps 50–100 are repeated. These steps are performed for each video field in the video sequence. Thus, a change in magnification, rotation and translation are determined for the subsequent video field. These determinations of change in magnification, rotation and translation are then added to the pre-processing change in magnification, rotation and translation applied to the subsequent video field in steps 102, 104 and 106 to yield a total change in magnification, rotation and translation of the key area from the key field to the subsequent video field. In a similar manner, the total change in magnification, rotation and translation determined for the subsequent video field is used to pre-process the next subsequent video field in the video sequence, etc.

The result of these steps is that, for each video field in the video sequence, a change in magnification, rotation and translation of the key area is determined. The video sequence may then be modified by de-magnifying, de-rotating and detranslating each video field in the video sequence, other than the key field, so that the image contained in the key area appears motionless and at the same magnification and orientation through the entire video sequence.

Of course, a person of ordinary skill in the art, upon a careful consideration of the above description of the method 10, would readily appreciate that modifications, additions, substitutions, deletions and other changes may be made to the method as described above and depicted in the accompanying drawings, which is but a single embodiment of the invention, and these changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of stabilizing a video image of interest displayed in multiple video fields of a video sequence, the method comprising the steps of:

subdividing a selected area of a first video field into nested pixel blocks including. multiple levels of progressively smaller pixel block subdivisions, the area containing the video image;

determining horizontal and vertical translation of each of the pixel blocks in each of the pixel block subdivision levels from the first video field to a second video field; and determining change in magnification of the image from the first video field to the second video field by dividing each of relative translations of pairs of the pixel blocks by respective distances between centers the pairs of pixel blocks.

2. A method of stabilizing a video image of interest displayed in multiple video fields of a video sequence, the method comprising the'steps of:

subdividing a selected area of a first video field into nested pixel blocks including multiple levels of progressively smaller pixel block subdivisions, the area containing the video image;

determining horizontal and vertical translation of each of the pixel blocks in each of the pixel block subdivision levels from the first video field to a second video field; and determining rotation of the image from the first video field to the second video field by calculating the inverse tangent of each of relative translations of pairs of the pixel blocks divided by respective distances between centers of the pixel block pairs.

3. A method of stabilizing a video image of interest displayed in multiple video fields of a video sequence, the method comprising the steps of:

subdividing a selected area of a first video field into nested pixel blocks including multiple levels of progressively smaller pixel block subdivisions, the area containing the video image;

determining horizontal and vertical translation of each of the pixel blocks in each of the pixel block subdivision levels from the first video field to a second video field; and determining translation of the image from the first video field to the second video field by determining a change in magnification of the image from the first video field to the second video field, determining rotation of the image from the first video field to the second video field, correcting the horizontal and vertical translations of each of the pixel blocks in the smallest pixel block subdivision for the change in magnification and rotation of the image from the first video field to the second video field, and averaging the corrected horizontal and vertical pixel block translations.

4. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field; and calculating a change in magnification of the image from the first video field to the second video field, wherein the calculating step is performed by dividing a relative horizontal displacement between a pair of the pixel blocks in one of the rows of pixel blocks by a distance between respective centers of the pair of pixel blocks.

5. The method according to claim 4, wherein the dividing step is performed for each pair of the pixel blocks in each row of pixel blocks in the area.

6. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field;, and calculating a change in magnification of the image from the first video field to the second video field, wherein the calculating step is performed by dividing a relative vertical displacement between a pair of the pixel blocks in one of the columns of pixel blocks by a distance between respective centers of the pair of pixel blocks.

7. The method according to claim 6, wherein the dividing step is performed for each pair of the pixel blocks in each column of pixel blocks in the area.

8. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field; and calculating a change in magnification of the image from the first video field to the second video field, wherein the calculating step is performed by dividing relative vertical displacements between respective pairs of pixel blocks in each column of pixel blocks by respective distances between centers of the pixel block column pairs, dividing relative horizontal displacements between respective pairs of pixel blocks in each row of pixel blocks by respective distances between centers of the pixel block row pairs, and averaging together the results of both of the dividing steps.

9. The method according to claim 8, further comprising the step of weighting the results of both of the dividing steps prior to the averaging step.

10. The method according to claim 9, wherein the weighting step further comprises assigning greater weight to results of the dividing steps having relatively greater respective distances between the pixel block pair centers.

11. The method according to claim 9, further comprising the step of excluding from the averaging and weighting steps results of the dividing steps which are more than one standard deviation from the average of the results of the dividing steps.

12. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field, and calculating rotation of the image from the first video field to the second video field, wherein the calculating step is performed by dividing a relative horizontal displacement between a pair of the pixel blocks in one of the columns of pixel blocks by a distance between respective centers of the pair of pixel blocks.

13. The method according to claim 12, wherein the dividing step is performed for each pair of the pixel blocks in each column of pixel blocks in the area.

14. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field; and calculating rotation of the image from the first video field to the second video field, wherein the calculating step is performed by dividing a relative vertical displacement between a pair of the pixel blocks in one of the rows of pixel blocks by a distance between respective centers of the pair of pixel blocks.

15. The method according to claim 14, wherein the dividing step is performed for each pair of the pixel blocks in each row of pixel blocks in the area.

16. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field; and calculating rotation of the image from the first video field to the second video field, wherein the calculating step is performed by dividing relative vertical displacements between respective pairs of pixel blocks in each row of pixel blocks by respective distances between centers of the pixel block row pairs, dividing relative horizontal displacements between respective pairs of pixel blocks in each column of pixel blocks by respective distances between centers of the pixel block column pairs, and averaging together the results of both of the dividing steps.

17. The method according to claim 16, further comprising the step of weighting the results of both of the dividing steps prior to the averaging step.

18. The method according to claim 17, wherein the weighting step further comprises assigning greater weight to results of the dividing steps having relatively greater respective distances between the pixel block pair centers.

19. The method according to claim 17, further comprising the step of excluding from the averaging and weighting steps results of the dividing steps which are more than one standard deviation from the average of the results of the dividing steps.

20. A method of stabilizing a video image of interest displayed in multiple video fields of a video sequence, the method comprising the steps of:

dividing an area of a first video field of the video sequence into rows and columns of pixel blocks, the area containing the image;

determining a horizontal and vertical translation of each of the pixel blocks from the first video field to a second video field;

utilizing the pixel block horizontal and vertical displacements to calculate a change in magnification of the image from the first video field to the second video field;

utilizing the pixel block horizontal and vertical displacements to calculate rotation of the image from the first video field to the second video field;

correcting the horizontal and vertical displacements of the pixel blocks for the change in magnification and rotation from the first video field to the second video field;

averaging the corrected horizontal displacements of the pixel blocks to determine horizontal displacement of the image from the first video field to the second video field; and averaging the corrected vertical displacements of the pixel blocks to determine vertical displacement of the image from the first video field to the second video field.

21. A method of stabilizing a video image of interest displayed in multiple video fields of a video sequence, the method comprising the steps of:

determining a change in magnification of the image from a first video field to a second video field of the video sequence;

determining rotation of the image from the first video field to the second video field;

determining translation of the image from the first video field to the second video field;

de-magnifying a third video field of the video sequence using the opposite of the change in magnification of the image from the first video field to the second video field;

de-rotating the third video field using the opposite of the rotation of the image from the first video field to the second video field; and de-translating the third video field using the opposite of the translation of the image from the first video field to the second video field.

22. The method according to claim 21, further comprising the step of determining a change in magnification, rotation and translation of the image from the first video field to the de-magnified, de-rotated and de-translated third video field.

23. The method according to claim 22, further comprising the steps of:

determining a change in magnification of the image from the first video field to the third video field by adding the change in magnification of the image from the first video field to the second video field to the change in magnification of the image from the first video field to the de-magnified third video field;

determining rotation of the image from the first video field to the third video field by adding the rotation of the image from the first video field to the second video field to the rotation of the image from the first video field to the derotated third video field; and determining translation of the image from the first video field to the third video field by adding the translation of the image from the first video field to the second video field to the translation of the image from the first video field to the de-translated third video field.

* * * * *